(12) United States Patent
Russell et al.

(10) Patent No.: US 12,404,707 B2
(45) Date of Patent: ***Sep. 2, 2025

(54) SYSTEMS AND METHODS FOR PREVENTING A WALKWAY PLATFORM FLIP DOOR FROM BEING RAISED WITHOUT A GUARDRAIL INSTALLED

(71) Applicant: The Boeing Company, Chicago, IL (US)

(72) Inventors: Don J. Russell, Arlington, WA (US); Brennan J. Dunlap, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 17/369,560

(22) Filed: Jul. 7, 2021

(65) Prior Publication Data
US 2023/0011346 A1   Jan. 12, 2023

(51) Int. Cl.
*E05C 3/06* (2006.01)
*E04G 5/00* (2006.01)
(Continued)

(52) U.S. Cl.
CPC ............... *E05C 3/06* (2013.01); *E04G 5/001* (2013.01); *E04G 5/14* (2013.01); *E05C 3/004* (2013.01)

(58) Field of Classification Search
CPC .. E04G 1/15; E04G 1/00; E04G 5/006; E04G 5/14; E04G 5/001; E04G 5/141;
(Continued)

(56) References Cited

U.S. PATENT DOCUMENTS 5,941,024 A * 8/1999 Journault ............ E02D 29/1463
182/112
6,138,812 A * 10/2000 Kimener ................. E06B 11/00
49/133
(Continued)

FOREIGN PATENT DOCUMENTS

CN     201793023 U  *  4/2011
CN     109733637 A  *  5/2019
(Continued)

OTHER PUBLICATIONS

Global Dossier Jan. 23, 2025.*
Extended European Search Report prepared by the European Patent Office in application No. EP 22 16 4657.3 dated Sep. 19, 2022.

*Primary Examiner* — Brian D Mattei
*Assistant Examiner* — Kathleen M. McFarland
(74) *Attorney, Agent, or Firm* — Walters & Wasylyna LLC

(57) ABSTRACT

In an example, a system for preventing a flip door from being raised without a guardrail installed is disclosed. The system includes a guardrail having a post, and the post having a post dog. The system also includes a safety latch mechanism configured to be coupled to a fixed structure. The safety latch mechanism includes a body, a socket disposed in the body and configured to receive the post, and a door latch rotatably coupled to the body and biased in a latched position that is configured to retain a flip door in a lowered position. Based on the post being inserted into the socket of the safety latch mechanism, the post dog engages with and rotates the door latch from the latched position to an unlatched position, thereby allowing the flip door to be raised from the lowered position to a raised position.

20 Claims, 11 Drawing Sheets

(51) Int. Cl.
*E04G 5/14* (2006.01)
*E05C 3/00* (2006.01)

(58) Field of Classification Search
CPC .......... E04G 2001/157; E04G 21/3233; E04G 21/3228; E05C 3/14; E05C 3/006; E05C 3/16; E05C 3/162; E05C 3/36; B64F 5/10; B64F 5/40; B66F 11/04; B66F 17/006; E05B 63/00; E05B 63/0008; E05B 15/00; E05B 65/00; E04F 11/18; E04F 11/1865; E04F 2011/1868; E04H 17/14; E04H 17/20; E06B 3/38; E06B 11/00; E05Y 2201/434; B25H 1/20; B60R 3/005; E04B 57/00; E04B 35/008; E05D 11/1007; E05D 11/1014; Y10T 292/17
See application file for complete search history.

(56) References Cited

U.S. PATENT DOCUMENTS

| | | | | |
|---|---|---|---|---|
| 7,841,645 | B2 * | 11/2010 | Diamond | B60P 3/34 296/165 |
| 8,365,472 | B2 * | 2/2013 | Grimaldi | B63B 17/04 114/364 |
| 8,403,109 | B2 * | 3/2013 | Bennett | E06C 5/02 182/113 |
| 8,479,884 | B2 * | 7/2013 | Mizell | E04G 3/00 182/141 |
| 9,027,712 | B2 * | 5/2015 | Melton | B65G 69/22 182/36 |
| 9,409,755 | B2 * | 8/2016 | Melton | B66F 11/04 |
| 10,730,372 | B2 * | 8/2020 | Roth | B60P 1/435 |
| 11,156,008 | B2 * | 10/2021 | Phan | B64F 5/60 |
| 11,319,713 | B2 * | 5/2022 | O'Keefe | B66F 11/04 |
| 11,512,477 | B2 * | 11/2022 | Restivo | E04G 5/14 |
| 11,608,649 | B2 * | 3/2023 | Hammond | E04G 5/001 |
| 11,773,606 | B2 * | 10/2023 | Phan | E04G 5/14 182/20 |
| 2003/0020253 | A1 * | 1/2003 | Albert Bosman | B60R 3/005 280/164.1 |
| 2006/0054392 | A1 * | 3/2006 | MacDonald | B66F 11/04 182/113 |
| 2013/0119651 | A1 * | 5/2013 | Conny | B60R 3/005 248/214 |
| 2015/0034418 | A1 * | 2/2015 | Melton | B66F 11/04 182/113 |
| 2018/0272951 | A1 * | 9/2018 | Oliver | B60R 3/005 |
| 2019/0135185 | A1 * | 5/2019 | Oliver | B60R 3/005 |
| 2019/0360219 | A1 * | 11/2019 | O'Keefe | E04G 3/28 |
| 2020/0165828 | A1 * | 5/2020 | Phan | E04G 21/3228 |
| 2021/0017774 | A1 * | 1/2021 | Phan | E04G 21/3228 |
| 2021/0087823 | A1 * | 3/2021 | Stawski | E04F 11/1865 |
| 2021/0156152 | A1 * | 5/2021 | Restivo | E04F 11/18 |

FOREIGN PATENT DOCUMENTS

| | | | | | |
|---|---|---|---|---|---|
| CN | 111216871 | A | * | 6/2020 | ........... B64C 1/1423 |
| CN | 111395722 | A | * | 7/2020 | ............... E04G 1/15 |
| CN | 111498765 | A | * | 8/2020 | |
| CN | 112210393 | A | * | 1/2021 | ............. C10B 41/00 |
| CN | 114772515 | A | * | 7/2022 | |
| CN | 115419318 | A | * | 12/2022 | |
| CN | 116464333 | A | * | 7/2023 | |
| CN | 116905780 | A | * | 10/2023 | |
| EP | 2572759 | A1 | * | 3/2013 | ............. A62B 99/00 |
| EP | 3 878 757 | A1 | | 9/2021 | |
| FR | 2980512 | A1 | * | 3/2013 | ............. E06B 11/00 |
| KR | 20140068451 | A | * | 6/2014 | |
| KR | 1020140068451 | A | | 6/2014 | |
| KR | 20190017837 | A | * | 2/2019 | |
| KR | 1020190017837 | A | | 2/2019 | |

\* cited by examiner

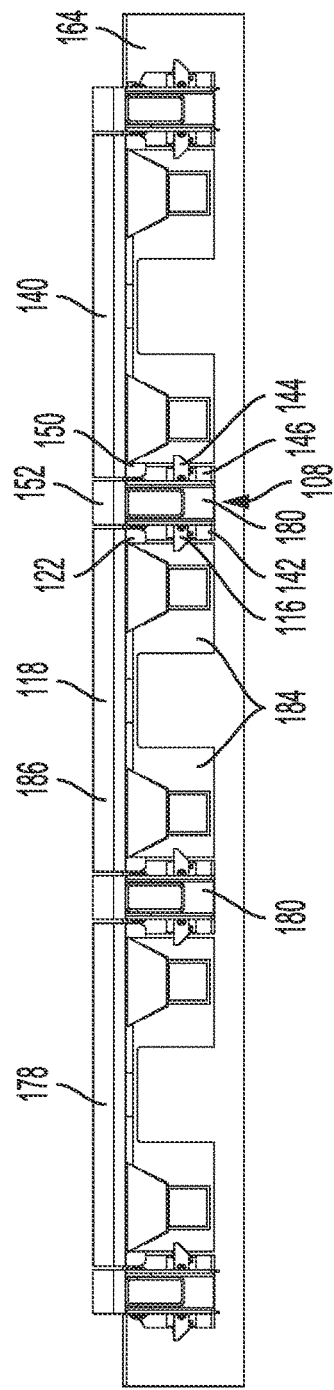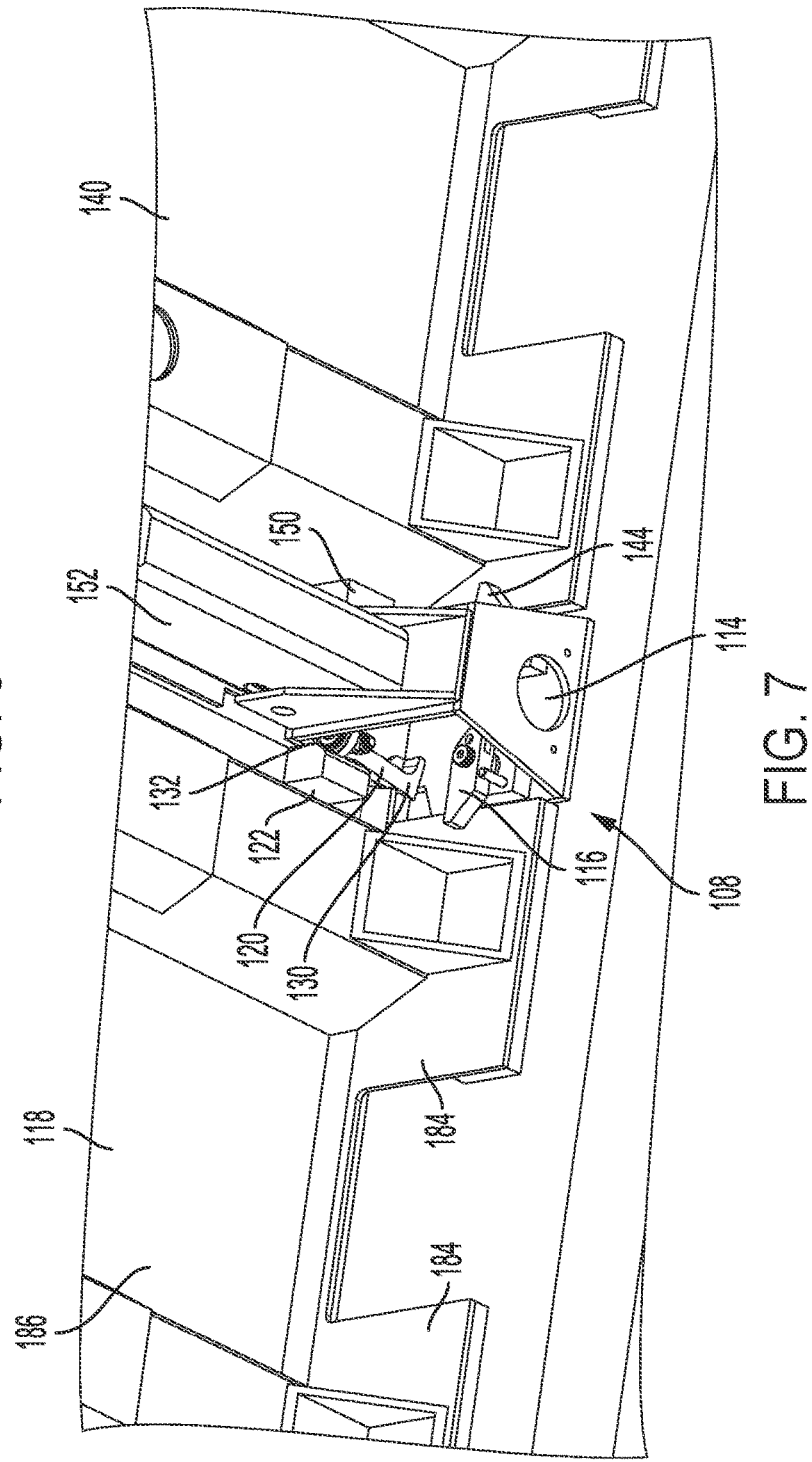

SYSTEMS AND METHODS FOR PREVENTING A WALKWAY PLATFORM FLIP DOOR FROM BEING RAISED WITHOUT A GUARDRAIL INSTALLED

FIELD

The present disclosure generally relates to systems and methods involving adjustable walkway platforms and guardrails, and more particularly, to preventing an adjustable walkway platform flip door from being raised without having a guardrail installed.

BACKGROUND

During their manufacture in an airplane production facility, aircraft move along the production line between different stages of assembly. This periodic (e.g., daily) movement is called "pulsing" the production line.

In some stages of assembly, personnel may access elevated portions of the aircraft by way of fixed deck platforms positioned within a few feet from the respective sides of the aircraft's fuselage. In such scenarios, movable deck platforms (e.g., flip doors) may be coupled to the fixed deck platforms and may be operable to provide personnel with the remaining platform access up to the body of the aircraft.

Prior to pulsing the production line, the movable deck platforms may be manually rotated (e.g., raised upward or lowered downward away from the fuselage) so as to provide sufficient clearance for airplane movement along the production line. To avoid falls from the fixed deck platform at this stage, removable guardrails can be manually installed near the end of the fixed deck platform.

Once a new airplane is in a proper position along the production line, the guardrails may be manually removed and the movable deck platform could be reinstalled or rotated to a horizontal position to once again close the gap between the fixed deck platform and the aircraft fuselage and provide standing access for personnel immediately next to the fuselage.

Existing designs for movable deck platforms typically rely on manual installation of guardrails or other forms of fall protection around the deck platforms after the deck platforms have been raised. However, with such designs, personnel often forget to install the guardrails, which can put the personnel at risk of falling. Thus, a safer alternative design is desired.

SUMMARY

In an example, a system for preventing a flip door from being raised without a guardrail installed is described. The system comprises a guardrail comprising a post, the post having a post dog. The system also comprises a safety latch mechanism configured to be coupled to a fixed structure. The safety latch mechanism comprises a body, a socket disposed in the body and configured to receive the post, and a door latch rotatably coupled to the body and biased in a latched position that is configured to retain a flip door in a lowered position. Based on the post being inserted into the socket of the safety latch mechanism, the post dog engages with and rotates the door latch from the latched position to an unlatched position, thereby allowing the flip door to be raised from the lowered position to a raised position.

In another example, another system for preventing a flip door from being raised without a guardrail installed is described. The system comprises a guardrail comprising two posts, each post having a respective post dog. The system also comprises two safety latch mechanisms configured to be coupled to a fixed structure on opposing sides of a flip door. Each safety latch mechanism comprises a body, a socket disposed in the body and configured to receive a respective post of the two posts, and a door latch rotatably coupled to the body and biased in a latched position that retains the flip door in a lowered position. Based on the respective post being inserted into the socket of the safety latch mechanism, the respective post dog engages with and rotates the door latch from the latched position to an unlatched position, thereby allowing the flip door to be raised from the lowered position to a raised position.

In another example, a method is described. The method comprises positioning each of two posts of a guardrail proximate to a respective socket disposed in a respective one of two safety latch mechanisms coupled to a fixed structure on opposing sides of a flip door, each post having a respective post dog and each safety latch mechanism comprising a respective body having the respective socket disposed therein, a respective door latch rotatably coupled to the body and biased in a latched position that retains the flip door in a lowered position, and a respective post latch that is rotatably coupled to the body, biased in a locked position, and retained in an unlocked position via engagement with the flip door based on the flip door being in the lowered position. The method also comprises inserting each respective post of the two posts into the respective socket such that the respective post dog engages with and rotates the respective door latch from the latched position to an unlatched position, thereby allowing the flip door to be raised from the lowered position to a raised position. The method also comprises raising the flip door from the lowered position to the raised position, thereby disengaging the flip door from the respective post latch, whereupon the respective post latch rotates from the unlocked position to the locked position, engages with the respective post dog, and retains the respective post in the safety latch mechanism.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 depicts an operating scenario involving the system of FIG. 1, according to an example implementation.

FIG. 7 depicts an operating scenario involving the system of FIG. 1, according to an example implementation.

DETAILED DESCRIPTION

Figure 1:
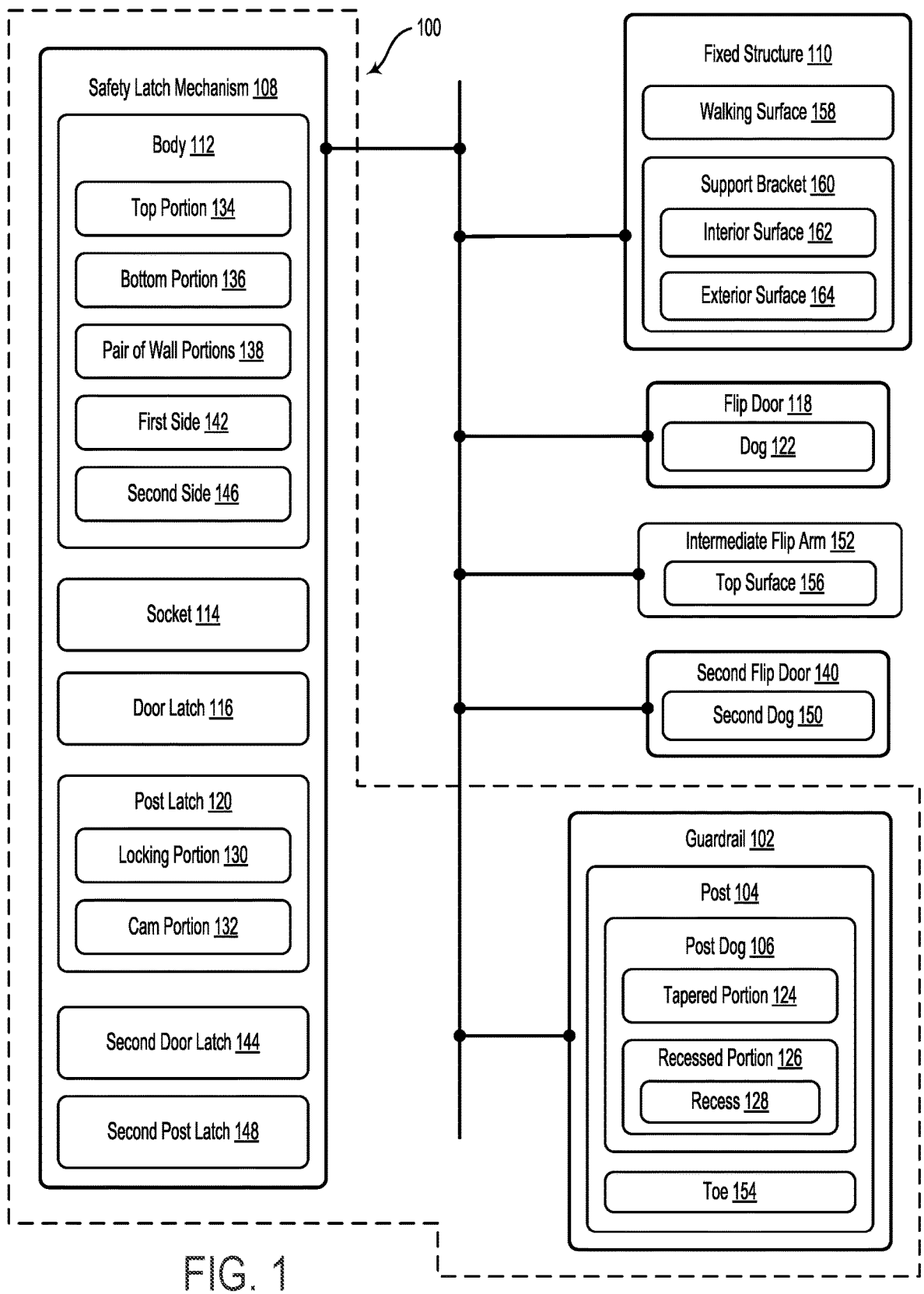
FIG. 1 depicts a system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein is a safety latch mechanism for preventing a movable deck platform (e.g., a flip door) from being raised without a guardrail (or guardrails) installed. To facilitate this, the safety latch mechanism includes a body, a socket for receiving a post of the guardrail, and at least one door latch rotatably coupled to the body and biased (e.g., spring biased) in a latched position that is configured to retain the flip door in a lowered position. When the post of the guardrail is then inserted into the socket, a post dog of the post engages with the at least one door latch and rotates the at least one door latch to an unlatched position, thus allowing the flip door to be raised. Within examples, the safety latch mechanism can be installed on a fixed structure in an outboard fashion (e.g., coupled to an exterior of the fixed structure to which the flip door is coupled, as opposed to an underside or interior of the fixed structure).

The safety latch mechanism can also include at least one post latch that is biased in a locked position, but is retained in an unlocked position via engagement with a dog on the flip door when the flip door is in the lowered position. Thus, when the flip door is raised, the dog disengages from the at least one post latch, thus causing the at least one post latch to rotate, engage with the post dog of the post, and lock the post in the safety latch mechanism until the flip door is lowered back to the lowered position.

With the arrangement described above, safety is increased since the flip door cannot be raised until a protective guardrail is installed.

These and other improvements are described in more detail below. Implementations described below are for purposes of example. The implementations described below, as well as other implementations, may provide other improvements as well.

Referring now to the figures, FIG. 1 illustrates a system 100, according to an example implementation. The various elements of system 100 could be formed from one or more materials such as aluminum, steel, plastic, and/or another material. Furthermore, it will be understood that such elements could additionally or alternatively be formed from machined parts.

The system 100 includes a guardrail 102, which includes a post 104 having a post dog 106. In some embodiments, the guardrail 102 can include other parts as well that are not explicitly shown in FIG. 1, such as at least one rail (e.g., a top rail and a base rail, or a top rail and one or more extending rails perpendicular to the top rail) and at least one additional post. In such scenarios, the post 104 and the at least one additional post could be coupled to the top rail and the base rail.

The system 100 also includes a safety latch mechanism 108 configured to be coupled to a fixed structure 110. For example, the safety latch mechanism 108 can be coupled to the fixed structure 110 by way of one or more fasteners (e.g., screws, bolts, etc.). The fixed structure 110 can be a deck structure having one or more deck platforms on which personnel can walk and stand.

The safety latch mechanism 108 includes a body 112, a socket 114 disposed in the body 112 and configured to receive the post 104, and a door latch 116. The door latch 116 is rotatably coupled to the body 112 and biased in a latched position that is configured to retain a flip door 118 in a lowered position. Within examples, the door latch 116 can be a spring-loaded latch that is biased in the latched position by way of one or more springs. In alternative embodiments, the door latch 116 can be biased by way of some other mechanism, other than a spring.

As described herein, elements that are "rotatably coupled" to one another could be coupled by way of a pin, a rotary bearing; or at least one rotary bushing and a stripper bolt. Other types of flexible and/or adjustable couplings are contemplated to join the relevant elements in a rotatable/pivotable fashion. For example, it will be understood that other types of rotatable couplings are contemplated herein. Without limitation, elements of the system 100 could be rotatably coupled to one another by way of a straight or articulated axle, a clevis pin, a plain bearing (e.g., sleeve bearing/bushing), a ball bearing, or roller bearing, among other possibilities.

The flip door 118 can be rotatably coupled to the fixed structure 110 such that the flip door 118 can rotate between the lowered position and a raised position. To unlatch the door latch 116 and thus allow the flip door 118 to be raised from the lowered position to the raised position, the guardrail 102 is inserted into the safety latch mechanism 108. In particular, based on the post 104 being inserted into the socket 114 of the safety latch mechanism 108, the post dog 106 engages with and rotates the door latch 116 from the latched position to an unlatched position, thereby allowing the flip door 118 to be raised from the lowered position to the raised position. Furthermore, based on the flip door 118 being lowered to the lowered position and the post 104 being removed from the socket 114, the post dog 106 can disengage from the door latch 116, thus rotating the door latch 116 to the latched positon at which the door latch 116 retains the flip door 118 in the lowered position.

In some embodiments, the safety latch mechanism 108 also includes a post latch 120 rotatably coupled to the body 112 and biased in a locked position. In such a scenario, the flip door 118 includes a dog 122 that is configured to engage with and retain the post latch 120 in an unlocked position based on the flip door 118 being in the lowered position. Within examples, the post latch 120 can be a spring-loaded latch that is biased in the locked position by way of one or more springs. In alternative embodiments, the post latch 120 can be biased by way of some other mechanism, other than a spring.

The post latch 120 and can also be involved in helping promote engagement between the guardrail 102 and the safety latch mechanism 108. In particular, based on the post 104 being inserted into the socket 114 of the safety latch mechanism 108 and the flip door 118 being raised to the raised position, the dog 122 is configured to disengage from the post latch 120, thereby causing the post latch 120 to rotate from the unlocked position to the locked position, whereupon the post latch 120 engages with the post dog 106 and retains the post 104 in the safety latch mechanism 108. Additionally, the post latch 120 can be involved in disengaging the guardrail 102 from the safety latch mechanism 108. In particular, based on the flip door 118 being lowered from the raised position to the lowered position, the dog 122 is configured to engage with the post latch 120, causing the post latch 120 to rotate from the locked position to the unlocked position and disengage from the post dog 106, thereby allowing the post 104 to be removed from the socket 114. Further, based on the post 104 being removed from the socket 114, the door latch 116 rotates from the unlatched position to the latched position, thereby retaining the flip door 118 in the lowered position.

The post dog 106 can be configured to facilitate engagement with the door latch 116 and the post latch 120. For instance, in some embodiments, the post dog 106 has a tapered portion 124 and a recessed portion 126.

The tapered portion 124 is configured to engage with the door latch 116 and retain the door latch 116 in the unlatched position based on the post 104 being inserted into the socket 114. For instance, as the post 104 is inserted into the socket 114, the tapered portion 124 can push and rotate the door latch 116 from the latched position to the unlatched position, and thereafter retain the door latch 116 in the unlatched position by preventing rotation back to the latched position so long as the post 104 remains in the socket 114.

The recessed portion 126 includes a recess 128 configured to receive the post latch 120 based on the post 104 being inserted into the socket 114 and the flip door 118 is in the raised position. For instance, once the post 104 has been inserted into the socket 114 and the flip door 118 is raised such that the dog 122 disengages from the post latch 120, the post latch 120—which is aligned with the recessed portion 126—can rotate into the recess 128, thereby preventing the post 104 from being removed from the socket 114.

To facilitate this in some embodiments, the post latch 120 can have a locking portion 130 and a cam portion 132. With this arrangement, the dog 122 of the flip door 118 is configured to engage with the cam portion 132 and retain the post latch 120 in the unlocked position based on the flip door 118 being in the lowered position. Further, based on the post 104 being inserted into the socket 114 of the safety latch mechanism 108 and the flip door 118 being raised to the raised position, the dog 122 is configured to disengage from the cam portion 132, thereby causing the post latch 120 to rotate from the unlocked position to the locked position, whereupon the locking portion 130 is received into the recess 128 of the post dog 106 and locks the post 104 in the safety latch mechanism 108.

In some embodiments, the body 112 of the safety latch mechanism 108 has a top portion 134, a bottom portion 136, and a pair of wall portions 138 that connect the top portion 134 to the bottom portion 136. In such a scenario, the door latch 116 is rotatably coupled to one of the pair of wall portions 138 (e.g., on an interior surface of one of the walls) and the post latch 120 is rotatably coupled to the top portion 134 (e.g., on an underside of the top portion 134 or on a top surface of the top portion 134, opposite the underside).

In some embodiments, the safety latch mechanism 108 is configured to be coupled to the fixed structure 110 between the flip door 118 and a second flip door 140 that is adjacent to the flip door 118. In such a scenario, the door latch 116 and the post latch 120 are rotatably coupled to a first side 142 of the body 112, and the safety latch mechanism 108 also includes a second door latch 144 rotatably coupled to a second side 146 of the body 112, opposite the first side 142, and biased in the latched position that is configured to retain the second flip door 140 in the lowered position. The safety latch mechanism 108 yet further includes a second post latch 148 rotatably coupled to the second side 146 of the body 112 and biased in the locked position. Additionally, the second flip door 140 can be configured similarly to the flip door 118, and can thus be rotatably coupled to the fixed structure 110 such that the second flip door 140 can rotate between the lowered position and the raised position. As such, the second flip door 140 includes a second dog 150 that is configured to engage with and retain the second post latch 148 in an unlocked position based on the second flip door 140 being in the lowered position.

Yet further in such a scenario, the system 100 can also include an intermediate flip arm 152 rotatably coupled to the safety latch mechanism 108. The intermediate flip arm 152 can be configured to be mounted between the flip door 118 and the second flip door 140, and also configured to move between the lowered position and the raised position. Additionally, the post 104 can include a toe 154 that is configured to engage with a top surface 156 of the intermediate flip arm 152 based on the post 104 being inserted into the socket 114 of the safety latch mechanism 108 and retain the intermediate flip arm 152 in the lowered position.

In some embodiments, the fixed structure 110 has a walking surface 158 and a support bracket 160. The support bracket 160 has an interior surface 162 facing a space underneath the walking surface 158, as well as an exterior surface 164 that is opposite the interior surface 162 and that faces away from the space underneath the walking surface 158. In such a scenario, the safety latch mechanism 108 is coupled to the exterior surface 164 of the support bracket 160. That is, the safety latch mechanism 108 is outboard-facing and coupled to a face of the fixed structure 110. Further, in such a scenario, the system 100 can also include the flip door 118 and the fixed structure 110.

Figure 2:
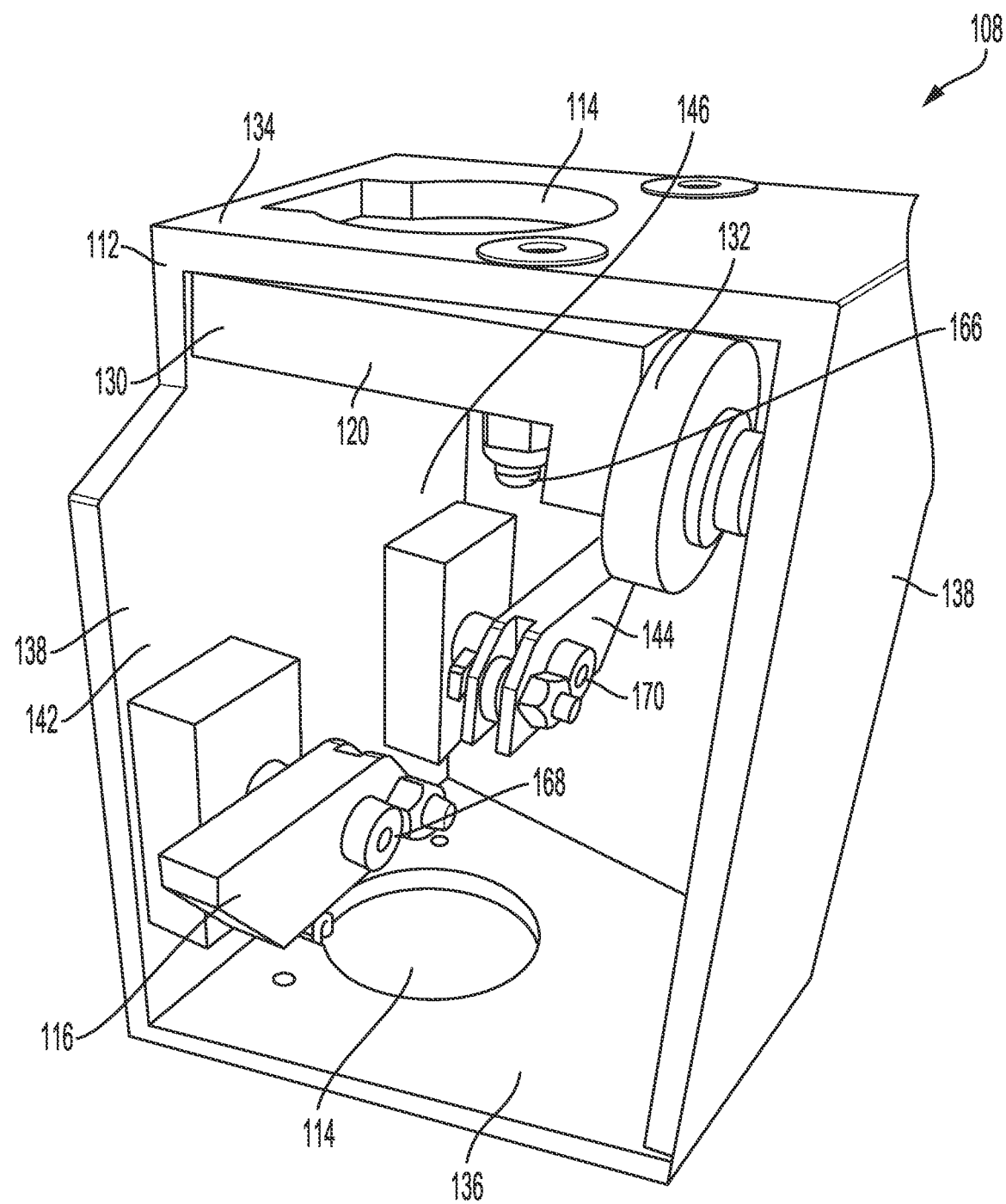
FIG. 2 depicts the safety latch mechanism of FIG. 1, according to an example implementation.

FIG. 2 depicts the safety latch mechanism 108 of the system 100, according to an example implementation. As shown, the post latch 120 is rotatably coupled to the top portion 134 of the body 112 by way of a pivot pin screw 166 defining an axis of rotation that is substantially perpendicular to the top portion 134 of the body 112. Although not explicitly shown in FIG. 2, the second post latch 148 on the second side 146 of the body 112 can be rotatably coupled in a similar way to the top portion 134 of the body 112.

As further shown, the door latch 116 is rotatably coupled to one of the pair of wall portions 138 on the first side 142 of the body 112 by way of a pivot pin 168, and the second door latch 144 is rotatably coupled to the same one of the pair of wall portions 138 on the second side 146 of the body 112 by way of a pivot pin 170. Pivot pin 168 and pivot pin 170 each define a respective axis of rotation that is substantially perpendicular to the pair of wall portions 138.

Figure 4:
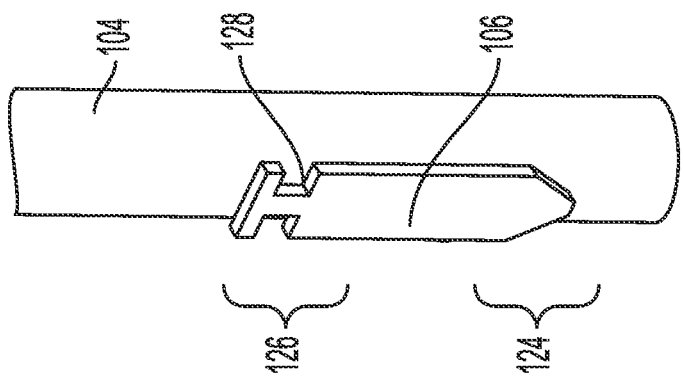
FIG. 4 depicts the guardrail of FIG. 1, according to an example implementation.
Figure 3:
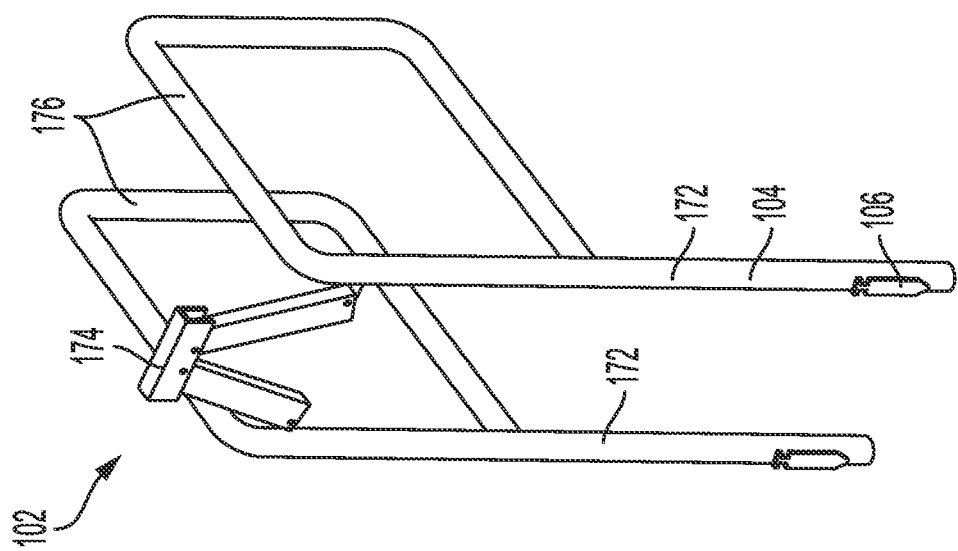
FIG. 3 depicts the guardrail of FIG. 1, according to an example implementation.

FIG. 3 and FIG. 4 each depict the guardrail 102, according to an example implementation. FIG. 3 depicts the guardrail 102 having two posts 172, with each post having the configuration of the post 104 and the post dog 106 described above. As shown, the guardrail 102 includes a foldable top rail 174, as well as two extending rails 176 that are perpendicular to the foldable top rail 174. FIG. 3 specifically depicts the guardrail 102 in a partially-folded scenario. Some embodiments of the guardrail 102 can be foldable for storage purposes, and can be unfolded before insertion into sockets of safety latch mechanisms. In alternative embodiments, the guardrail 102 can include only a single post, configured in the same way or a similar way as the post 104 described above.

FIG. 4 depicts a zoomed-in view of the post 104, showing the tapered portion 124, the recessed portion 126, and the recess 128 of the post dog 106 described above.

FIGS. 5-15 depict various operating scenarios involving the system 100, as illustrated and described in reference to FIG. 1. For clarity, only a subset of the total structures of the system 100 are specifically numbered in FIGS. 5-15.

Figure 5:
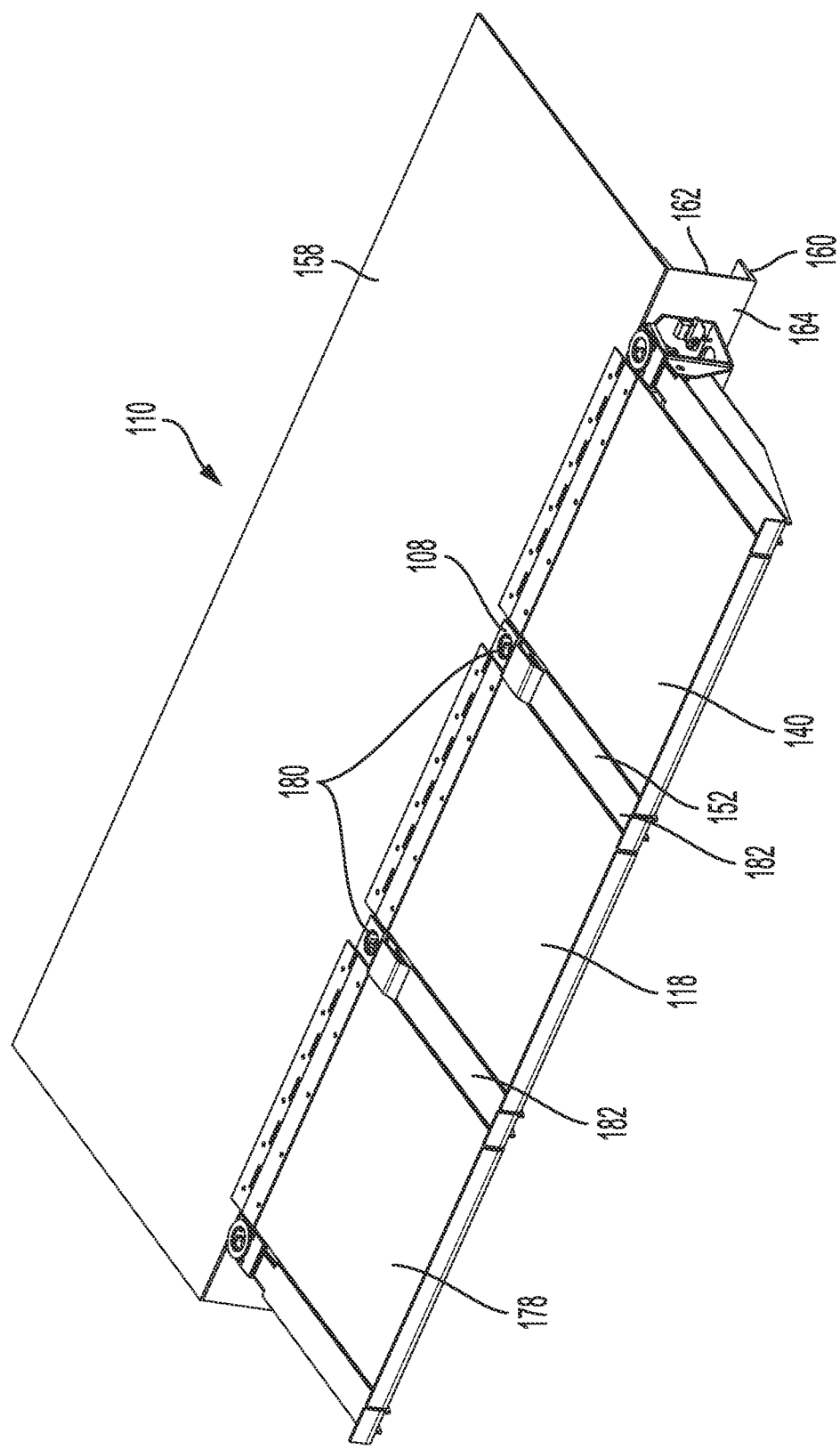
FIG. 5 depicts an operating scenario involving the system of FIG. 1, according to an example implementation.

FIG. 5 depicts an operating scenario in which a plurality of flip doors are in the lowered position. As shown, the plurality of flip doors include the flip door 118 and two other flip doors that are adjacent to the flip door 118—namely, the second flip door 140 and a third flip door 178. Four safety latch mechanisms coupled to the exterior surface 164 of the support bracket 160 and four intermediate flip arms are shown as well, including two safety latch mechanisms 180 on opposing sides of the flip door 118 (of which the safety latch mechanism 108 is labeled and is representative), and further including two intermediate flip arms 182 (of which the intermediate flip arm 152 is labeled and is representative).

Each of the two safety latch mechanisms 180 is shown to be coupled to the fixed structure 110 between the flip door 118 and a respective flip door of the two other flip doors. Further, each of the flip doors is shown to be rotatably coupled to the fixed structure 110 by way of a hinge. Yet further, each intermediate flip arm is shown to be rotatably coupled to a respective one of the safety latch mechanisms.

In the lowered position, the flip doors and intermediate flip arms extend substantially parallel along a reference plane that is parallel to the walking surface 158 of the fixed structure 110. Further, the top surfaces of the intermediate flip arms are substantially flush with respect to the top surfaces of the flip doors.

FIG. 6 depicts another view of the operating scenario in which the flip door 118, the second flip door 140, and the third flip door 178 are in the lowered position. FIG. 6 also shows the two safety latch mechanisms 180, each with two respective door latches in the latched position and two respective post latches retained in the unlocked position by way of the dogs of the corresponding flip doors (e.g., the dog 122 of the flip door 118 and the second dog 150 of the second flip door 140).

As further shown, the flip door 118 is shown to include a strike flange portion 184 and a walking portion 186, where the strike flange portion 184 is substantially perpendicular to the walking portion 186, and is also substantially parallel (and adjacent to) the exterior surface 164 when the flip door 118 is in the lowered position. The strike flange portion 184 also includes two flaps on opposing sides of the flip door 118, although could be comprised of more or less flaps in alternative embodiments. Each of the other two flip doors are shown to be similarly configured, each with a respective strike flange portion and a respective walking portion. With the flip door 118 in the lowered position, the door latch 116 extends in front of the strike flange portion 184, thus preventing movement of the strike flange portion 184 past the door latch 116, thereby retaining the flip door 118 in the lowered position.

FIG. 7 depicts another view of the operating scenario of FIG. 6.

Figure 8:
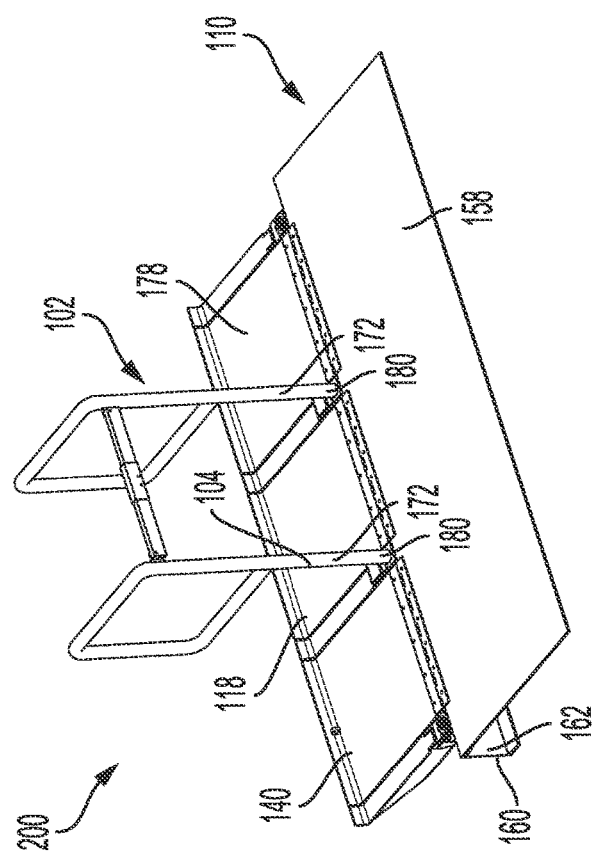
FIG. 8 depicts an operating scenario involving the system of FIG. 1, according to an example implementation.

FIG. 8 depicts an operating scenario in which the guardrail 102 shown in FIGS. 3 and 4 is inserted into the respective sockets of the two safety latch mechanisms 180. In example embodiments, another system 200 can include the guardrail 102 having the two posts 172, of which the post 104 of system 100 is representative, and can also include the two safety latch mechanisms 180, of which the safety latch mechanism 108 of system 100 is representative.

Figure 9:
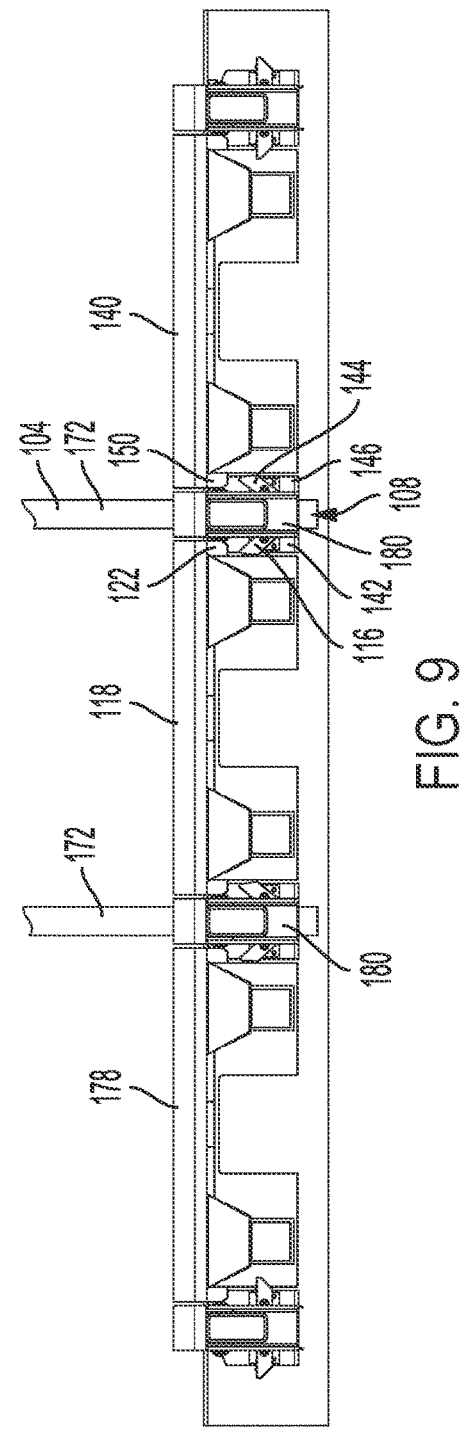
FIG. 9 depicts an operating scenario involving the system of FIG. 1, according to an example implementation.

FIG. 9 depicts another view of the operating scenario in which the two posts 172 of the guardrail 102 are inserted into the respective sockets of the two safety latch mechanisms 180. The two safety latch mechanisms 180 are each shown with two respective door latches in the unlatched position, although since the flip door 118 and the second flip door 140 are in the lowered position, the respective post latches of those flip doors are still retained in the unlocked position by way of the dog 122 and the second dog 150. Because the door latches are each in the unlatched position, the strike flange portion 184 is clear to move past the door latches and the flip door 118 can be moved to the raised position.

Figure 10:
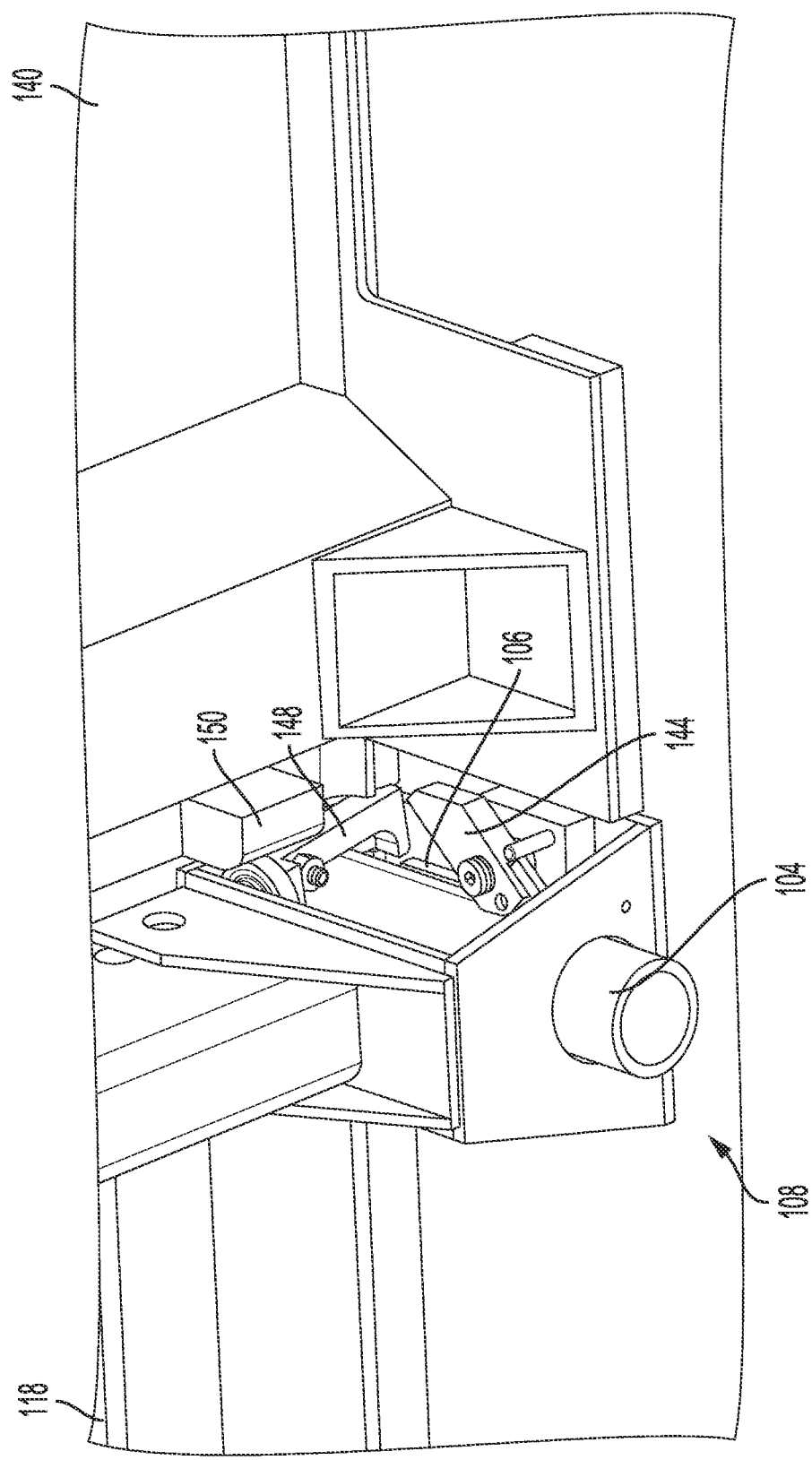
FIG. 10 depicts an operating scenario involving the system of FIG. 1, according to an example implementation.

FIG. 10 depicts an operating scenario in which the two posts 172 of the guardrail 102 are inserted into the respective sockets of the two safety latch mechanisms 180 and the flip door 118 has been raised to the raised position, but where the second flip door 140 is still in the lowered position.

Figure 11:
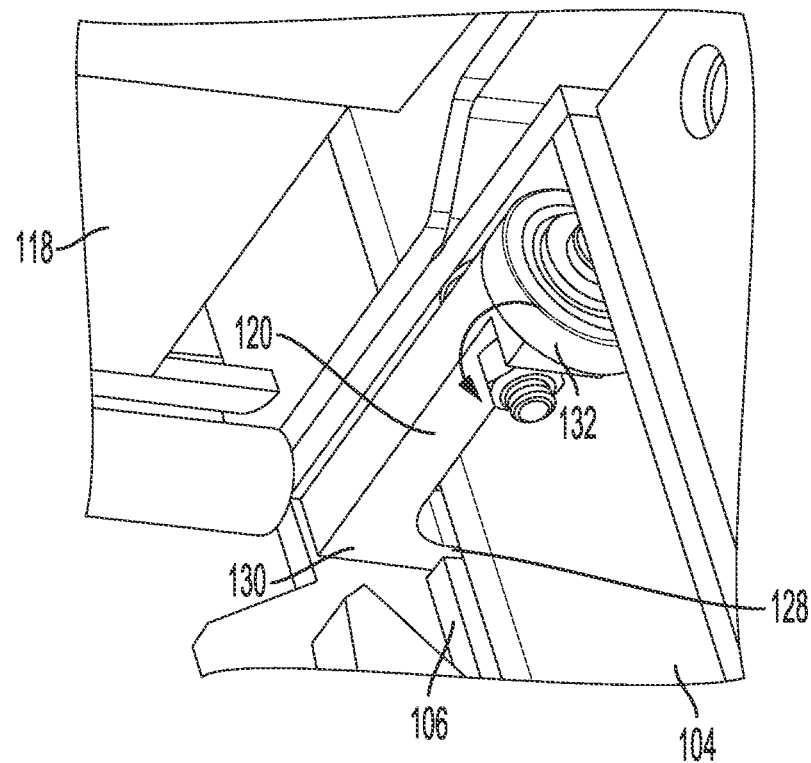
FIG. 11 depicts an operating scenario involving the system of FIG. 1, according to an example implementation.

FIG. 11 depicts another view of the operating scenario in which the flip door 118 has been raised to the raised position. FIG. 11 also shows (via an arrow) a direction of rotation of the post latch 120 from the unlocked position to the locked position that occurs when the dog 122 has disengaged from the cam portion 132 of the post latch 120. Further, upon rotation, the locking portion 130 is received into the recess 128 of the post dog 106, thereby locking the post 104 in the safety latch mechanism 108.

Figure 12:
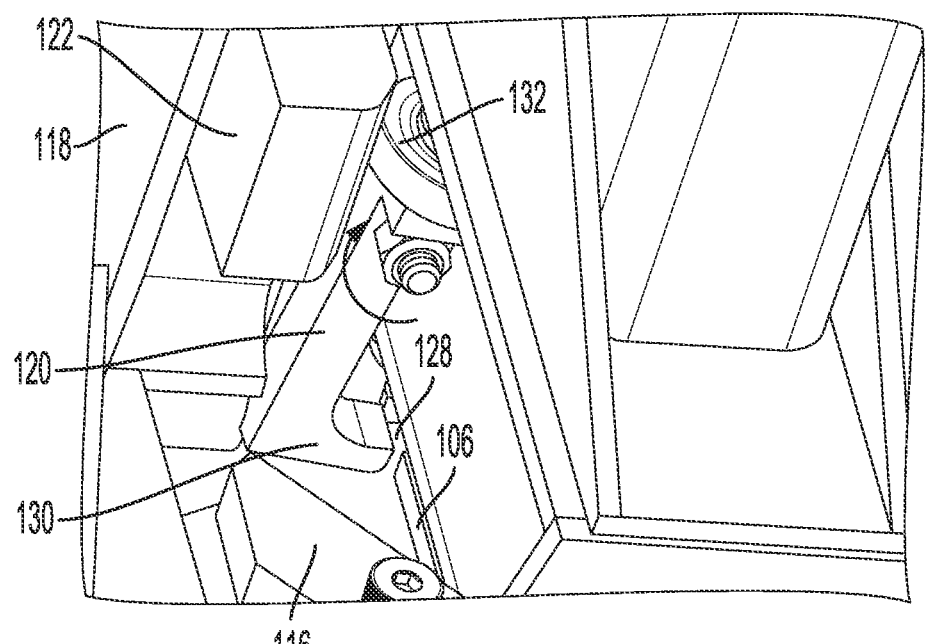
FIG. 12 depicts an operating scenario involving the system of FIG. 1, according to an example implementation.

FIG. 12 depicts an operating scenario in which the flip door 118 has been lowered back down to the lowered position, thus engaging the dog 122 with the cam portion 132. The engagement of the dog 122 with the cam portion 132 rotates (shown via an arrow) the locking portion 130 out of the recess 128, thereby allowing the post 104 to be removed from the safety latch mechanism 108.

FIG. 13 again depicts the operating scenario in which the guardrail 102 is inserted and the flip door 118 is in the raised position. As further shown, the toe 154 of the post 104 contacts the top surface 156 of the intermediate flip arm 152.

Figure 13:
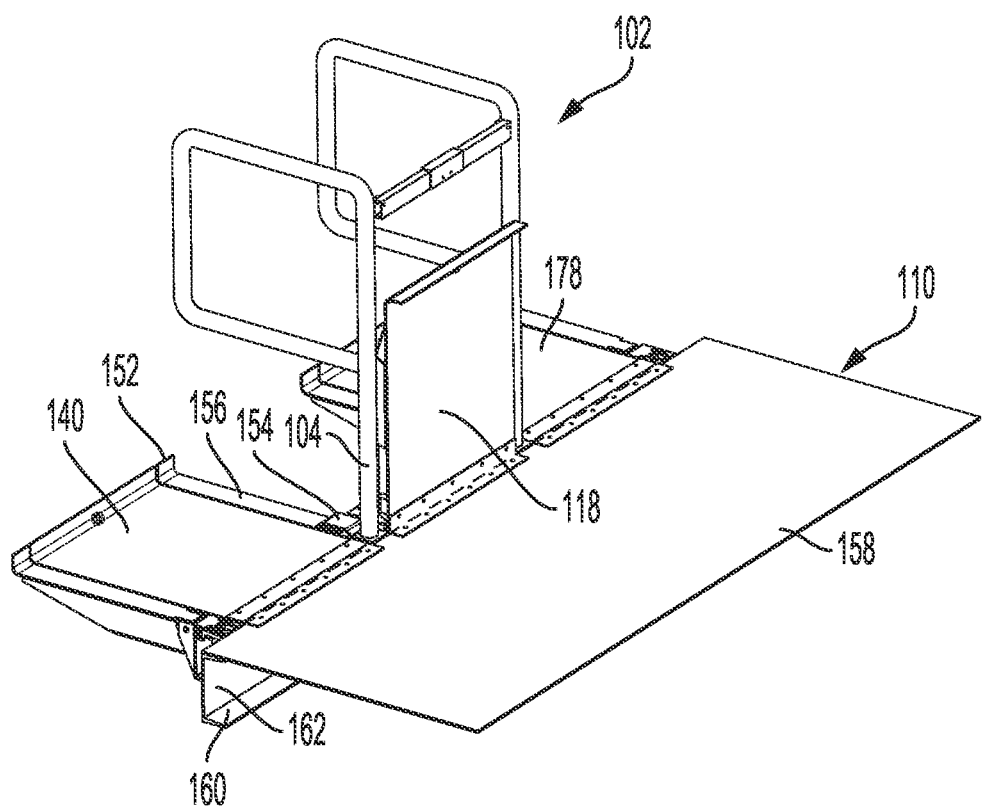
FIG. 13 depicts an operating scenario involving the system of FIG. 1, according to an example implementation.
Figure 14:
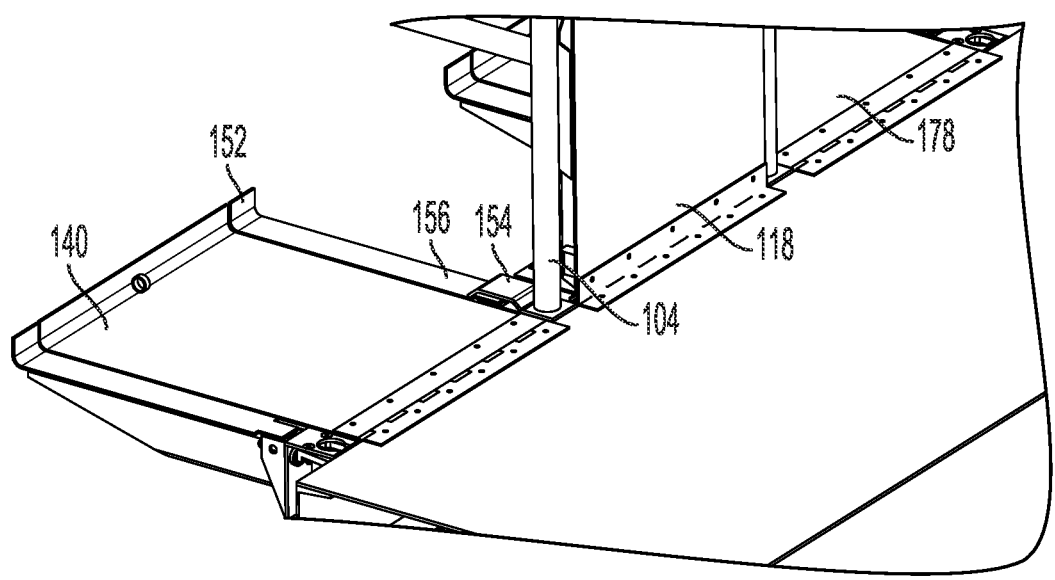
FIG. 14 depicts an operating scenario involving the system of FIG. 1, according to an example implementation.

FIG. 14 next depicts a zoomed-in view of the operating scenario of FIG. 13.

Figure 15:
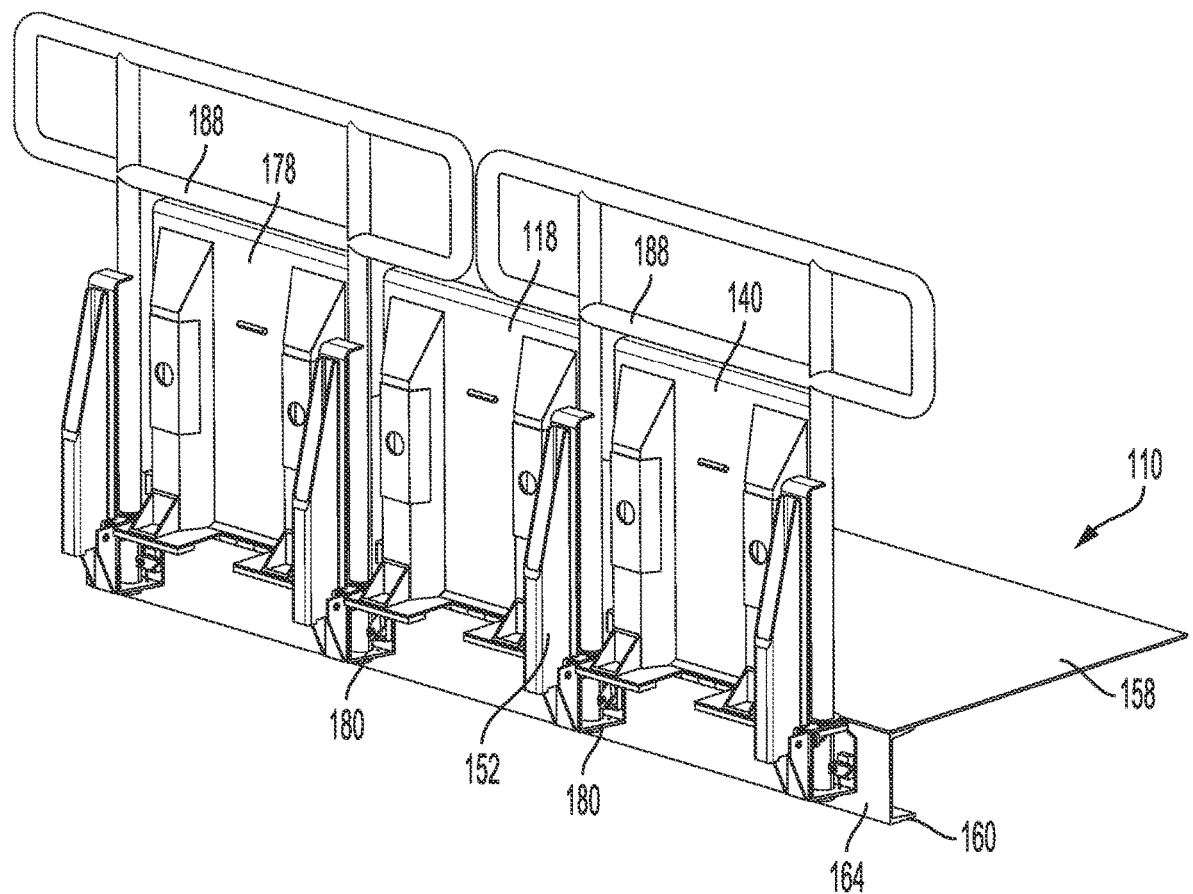
FIG. 15 depicts an operating scenario involving the system of FIG. 1, according to an example implementation.

FIG. 15 depicts an operating scenario in which, instead of the guardrail 102 being inserted into the two safety latch mechanisms 180, a pair of guardrails 188 are inserted into the safety latch mechanisms. That is, FIG. 15 depicts a scenario in which posts from two separate guardrails can be used to raise a single flip door, as opposed to two posts from a single guardrail are used to raise a single flip door. As further shown, each of the flip doors, as well as each of the intermediate flip arms, are in the raised position.

Figure 16:
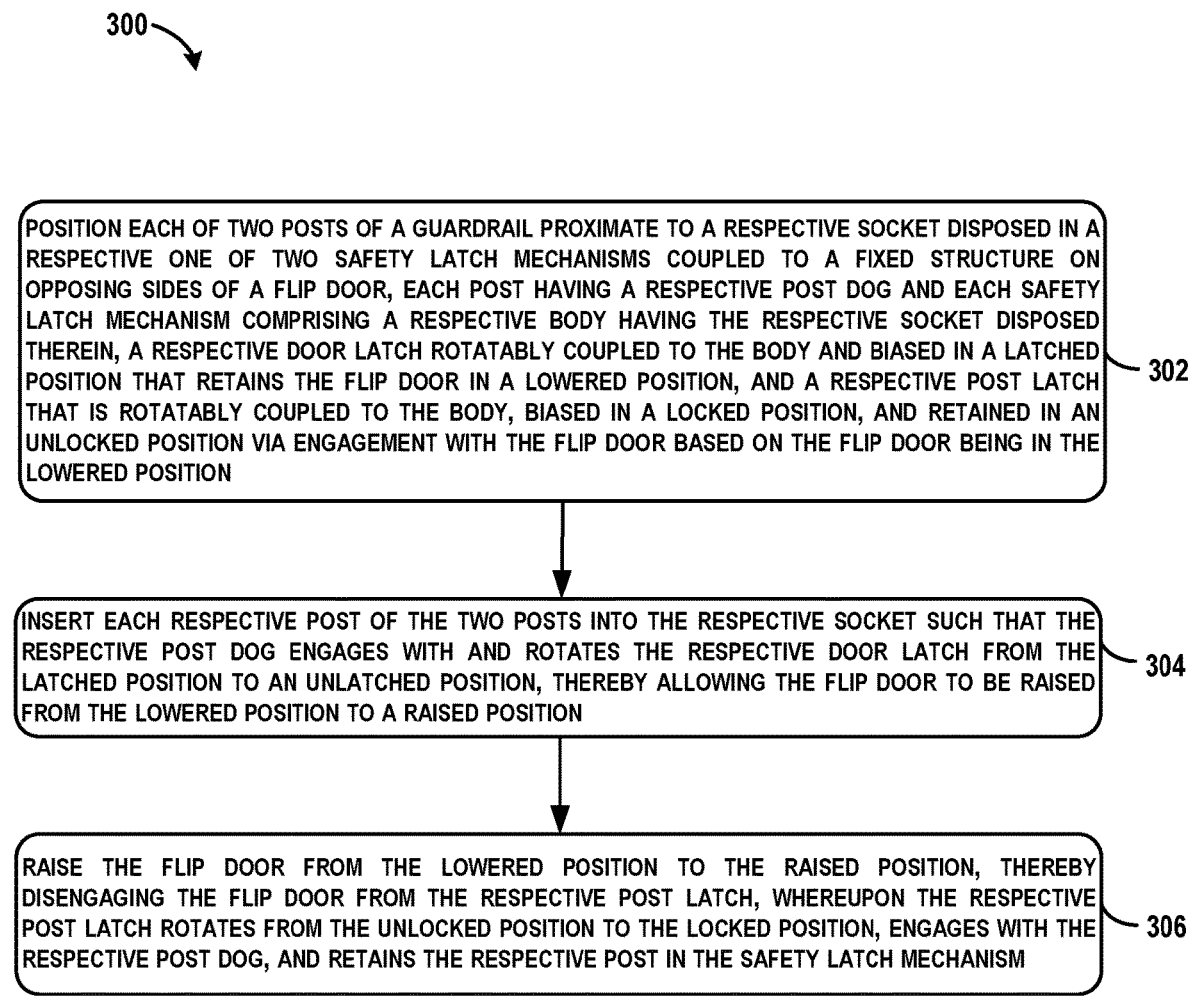
FIG. 16 shows a flowchart of an example method, according to an example implementation.

FIG. 16 shows a flowchart of an example of a method 300 that could be used with the system 100, the other system 200, and elements thereof shown in FIGS. 1-15. Method 300 may include one or more operations, functions, or actions as illustrated by one or more of blocks 302-306.

At block 302, the method 300 includes positioning each of two posts of a guardrail proximate to a respective socket disposed in a respective one of two safety latch mechanisms coupled to a fixed structure on opposing sides of a flip door, each post having a respective post dog and each safety latch mechanism comprising a respective body having the respective socket disposed therein, a respective door latch rotatably coupled to the body and biased in a latched position that retains the flip door in a lowered position, and a respective post latch that is rotatably coupled to the body, biased in a locked position, and retained in an unlocked position via engagement with the flip door based on the flip door being in the lowered position.

At block 304, the method 300 includes inserting each respective post of the two posts into the respective socket such that the respective post dog engages with and rotates the respective door latch from the latched position to an unlatched position, thereby allowing the flip door to be raised from the lowered position to a raised position.

At block 306, the method 300 includes raising the flip door from the lowered position to the raised position, thereby disengaging the flip door from the respective post latch, whereupon the respective post latch rotates from the unlocked position to the locked position, engages with the respective post dog, and retains the respective post in the safety latch mechanism.

Within examples, the method 300 can also include lowering the flip door from the raised position to the lowered position, thereby engaging the flip door with the respective post latch, causing the respective post latch to rotate from the locked position to the unlocked position and disengage from the respective post dog, thereby allowing the respective post to be removed from the respective socket. The method 300 can also include removing each respective post of the two posts from the respective socket, thereby causing the respective door latch to rotate to the latched position and retain the flip door in the lowered position.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for preventing a flip door from being raised without a guardrail installed, the system comprising:
a guardrail comprising a post, the post having a post dog; and
a safety latch mechanism configured to be coupled to a fixed structure, the safety latch mechanism comprising:
a body,
a socket disposed in the body and configured to receive the post, and
a door latch rotatably coupled to the body and biased in a latched position that is configured to retain a flip door in a lowered position,
wherein based on the post being inserted into the socket of the safety latch mechanism, the post dog engages with and rotates the door latch from the latched position to an unlatched position, thereby allowing the flip door to be raised from the lowered position to a raised position.

2. The system of claim 1, wherein:
the safety latch mechanism further comprises a post latch rotatably coupled to the body and biased in a locked position,
the flip door comprises a dog that is configured to engage with and retain the post latch in an unlocked position based on the flip door being in the lowered position, and
based on the post being inserted into the socket of the safety latch mechanism and the flip door being raised to the raised position, the dog is configured to disengage from the post latch, thereby causing the post latch to rotate from the unlocked position to the locked position, whereupon the post latch engages with the post dog and retains the post in the safety latch mechanism.

3. The system of claim 2, wherein:
based on the flip door being lowered from the raised position to the lowered position, the dog is configured to engage with the post latch, causing the post latch to rotate from the locked position to the unlocked position and disengage from the post dog, thereby allowing the post to be removed from the socket, and
based on the post being removed from the socket, the door latch rotates from the unlatched position to the latched position, thereby retaining the flip door in the lowered position.

4. The system of claim 2, wherein:
the post dog comprises a tapered portion and a recessed portion,
the tapered portion is configured to engage with the door latch and retain the door latch in the unlatched position based on the post being inserted into the socket, and
the recessed portion comprises a recess configured to receive the post latch based on the post being inserted into the socket and the flip door is in the raised position.

5. The system of claim 4, wherein:
the post latch comprises a locking portion and a cam portion,
the dog is configured to engage with the cam portion and retain the post latch in the unlocked position based on the flip door being in the lowered position, and
based on the post being inserted into the socket of the safety latch mechanism and the flip door being raised to the raised position, the dog is configured to disengage from the cam portion, thereby causing the post latch to rotate from the unlocked position to the locked position, whereupon the locking portion is received into the recess of the post dog and locks the post in the safety latch mechanism.

6. The system of claim 2, wherein:

the body of the safety latch mechanism comprises a top portion, a bottom portion, and a pair of wall portions that connect the top portion to the bottom portion, the door latch is rotatably coupled to one of the pair of wall portions, the post latch is rotatably coupled to the top portion.

7. The system of claim 2, wherein:

the safety latch mechanism is configured to be coupled to the fixed structure between the flip door and a second flip door that is adjacent to the flip door, the door latch and the post latch are rotatably coupled to a first side of the body, the safety latch mechanism further comprises:
  a second door latch rotatably coupled to a second side of the body, opposite the first side, and biased in the latched position that is configured to retain the second flip door in the lowered position, and
  a second post latch rotatably coupled to the second side of the body and biased in the locked position, and the second flip door comprises a second dog that is configured to engage with and retain the second post latch in an unlocked position based on the second flip door being in the lowered position.

8. The system of claim 7, further comprising:

an intermediate flip arm rotatably coupled to the safety latch mechanism, configured to be mounted between the flip door and the second flip door, and configured to move between the lowered position and the raised position, wherein the post comprises a toe configured to engage with a top surface of the intermediate flip arm based on the post being inserted into the socket of the safety latch mechanism and retain the intermediate flip arm in the lowered position.

9. The system of claim 1, further comprising:

the flip door; and the fixed structure, wherein:
  the fixed structure comprises a walking surface and a support bracket, the support bracket having an interior surface facing a space underneath the walking surface, and an exterior surface, opposite the interior surface, facing away from the space, and
  the safety latch mechanism is coupled to the exterior surface of the support bracket.

10. A system for preventing a flip door from being raised without a guardrail installed, the system comprising:

a guardrail comprising two posts, each post having a respective post dog; and two safety latch mechanisms configured to be coupled to a fixed structure on opposing sides of a flip door, each safety latch mechanism comprising:
  a body,
  a socket disposed in the body and configured to receive a respective post of the two posts, and
  a door latch rotatably coupled to the body and biased in a latched position that retains the flip door in a lowered position, wherein based on the respective post being inserted into the socket of the safety latch mechanism, the respective post dog engages with and rotates the door latch from the latched position to an unlatched position, thereby allowing the flip door to be raised from the lowered position to a raised position.

11. The system of claim 10, wherein:

each safety latch mechanism further comprises a post latch rotatably coupled to the body and biased in a locked position, the flip door comprises a dog that is configured to engage with and retain the post latch in an unlocked position based on the flip door being in the lowered position, and based on the respective post being inserted into the socket of the safety latch mechanism and the flip door being raised to the raised position, the dog is configured to disengage from the post latch, thereby causing the post latch to rotate from the unlocked position to the locked position, whereupon the post latch engages with the respective post dog and retains the respective post in the safety latch mechanism.

12. The system of claim 11, wherein:

based on the flip door being lowered from the raised position to the lowered position, the dog is configured to engage with the post latch, causing the post latch to rotate from the locked position to the unlocked position and disengage from the respective post dog, thereby allowing the respective post to be removed from the socket, and based on the respective post being removed from the socket, the door latch rotates from the unlatched position to the latched position, thereby retaining the flip door in the lowered position.

13. The system of claim 11, wherein:

the respective post dog comprises a tapered portion and a recessed portion, the tapered portion is configured to engage with the door latch and retain the door latch in the unlatched position based on the respective post being inserted into the socket, and the recessed portion comprises a recess configured to receive the post latch based on the respective post being inserted into the socket and the flip door is in the raised position.

14. The system of claim 13, wherein:

the post latch comprises a locking portion and a cam portion, the dog is configured to engage with the cam portion and retain the post latch in the unlocked position based on the flip door being in the lowered position, and based on the respective post being inserted into the socket of the safety latch mechanism and the flip door being raised to the raised position, the dog is configured to disengage from the cam portion, thereby causing the post latch to rotate from the unlocked position to the locked position, whereupon the locking portion is received into the recess of the respective post dog and locks the respective post in the safety latch mechanism.

15. The system of claim 11, wherein:

the body of the safety latch mechanism comprises a top portion, a bottom portion, and a pair of wall portions that connect the top portion to the bottom portion, the door latch is rotatably coupled to one of the pair of wall portions, the post latch is rotatably coupled to the top portion.

16. The system of claim 11, wherein:
each safety latch mechanism is configured to be coupled to the fixed structure between the flip door and a respective flip door of two other flip doors that are adjacent to the flip door,
the door latch and the post latch are rotatably coupled to a first side of the body,
each safety latch mechanism further comprises:
a second door latch rotatably coupled to a second side of the body, opposite the first side, and biased in the latched position that is configured to retain the respective flip door in the lowered position, and
a second post latch rotatably coupled to the second side of the body and biased in the locked position, and
the respective flip door comprises a second dog that is configured to engage with and retain the second post latch in an unlocked position based on the respective flip door being in the lowered position.

17. The system of claim 16, further comprising:
two intermediate flip arms, wherein each intermediate flip arm is rotatably coupled to a respective one of the two safety latch mechanisms, configured to be mounted between the flip door and the respective flip door, and configured to move between the lowered position and the raised position,
wherein the respective post comprises a toe configured to engage with a top surface of the intermediate flip arm based on the respective post being inserted into the socket of the safety latch mechanism and retain the intermediate flip arm in the lowered position.

18. The system of claim 10, further comprising:
the flip door; and
the fixed structure,
wherein:
the fixed structure comprises a walking surface and a support bracket, the support bracket having an interior surface facing a space underneath the walking surface, and an exterior surface, opposite the interior surface, facing away from the space, and
the two safety latch mechanisms are coupled to the exterior surface of the support bracket.

19. A method comprising the system of claim 10, the method further comprising:
positioning each of the two posts of the guardrail proximate to a respective socket disposed in a respective one of the two safety latch mechanisms coupled to the fixed structure on the opposing sides of the flip door, each safety latch mechanism further comprising a respective post latch that is rotatably coupled to the body, biased in a locked position, and retained in an unlocked position via engagement with the flip door based on the flip door being in the lowered position;
inserting each respective post of the two posts into the respective socket such that the respective post dog engages with and rotates the respective door latch from the latched position to the unlatched position, thereby allowing the flip door to be raised from the lowered position to the raised position; and
raising the flip door from the lowered position to the raised position, thereby disengaging the flip door from the respective post latch, whereupon the respective post latch rotates from the unlocked position to the locked position, engages with the respective post dog, and retains the respective post in the safety latch mechanism.

20. The method of claim 19, further comprising:
lowering the flip door from the raised position to the lowered position, thereby engaging the flip door with the respective post latch, causing the respective post latch to rotate from the locked position to the unlocked position and disengage from the respective post dog, thereby allowing the respective post to be removed from the respective socket; and
removing each respective post of the two posts from the respective socket, thereby causing the respective door latch to rotate to the latched position and retain the flip door in the lowered position.

* * * * *